United States Patent [19]

Gordon

[11] 4,381,667

[45] May 3, 1983

[54] MEASUREMENT OF BOREHOLE TEMPERATURE

[76] Inventor: Thomas L. Gordon, 42 Olive Rd., Millendon, Western Australia, Australia

[21] Appl. No.: 258,749

[22] Filed: Apr. 29, 1981

[30] Foreign Application Priority Data

May 2, 1980 [AU] Australia ............................... PE3388

[51] Int. Cl.$^3$ ............................................. E21B 47/06
[52] U.S. Cl. ...................................................... 73/154
[58] Field of Search ...................... 73/154, 374, 343 R

[56] References Cited

U.S. PATENT DOCUMENTS 2,222,829 11/1940 Humason et al. ...................... 73/154
2,879,666 3/1959 Brown .................................... 73/374

Primary Examiner—Jerry W. Myracle
Attorney, Agent, or Firm—Harness, Dickey & Pierce

[57] ABSTRACT

A borehole survey tool of the type having a chamber for receiving a borehole survey instrument, and a shock absorbing assembly for supporting the survey instrument in the chamber, said shock absorbing assembly including a substantially helical return spring, and wherein there is provided elements for measuring borehole temperature comprising a maximum temperature registering thermometer mountable within a casing, the casing having a body portion and a shoulder portion, the casing being mountable in the borehole survey tool with the body portion received within the helical spring and the shoulder portion interposed between the survey instrument or an element of the survey tool and the adjacent end of the helical spring.

8 Claims, 2 Drawing Figures

U.S. Patent May 3, 1983 4,381,667
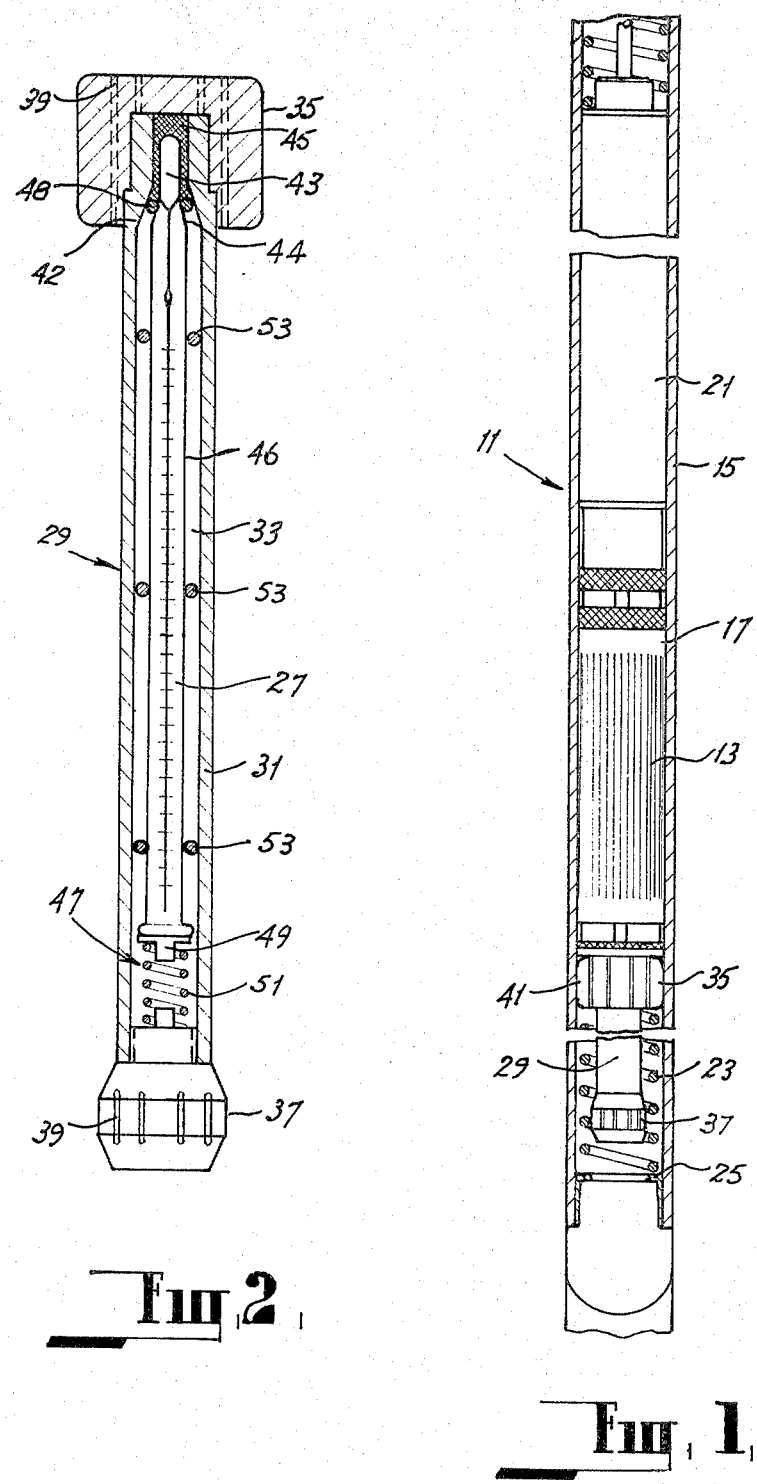

MEASUREMENT OF BOREHOLE TEMPERATURE

This invention relates to the measurement of downhole temperatures, in geological, petroleum or like boreholes and more particularly to a borehole survey tool having means for measurement of borehole temperatures.

A borehole temperature reading is not only useful in itself, but also allows the true bottom-hole temperature, and thus geothermal gradient, to be estimated. Anomalous temperature readings are important in detecting porous, possibly geopressured, zones and possible hydrothermal sources beds. The true bottom hole temperature is useful in determing the maturation stage of hydrocarbons.

At present, borehole temperature may be measured in a number of ways. The borehole temperature may be recorded by a maximum registering thermometer run with a wire-line log tool or a production test pressure gauge. A further way of recording borehole temperature is with drill mud flowline temperature sensors. Borehole temperature may also be recorded with maximum registering heat sensitive chemical indicators ("temp-plates") run with borehole survey tools.

The advantge of a maximum registering thermometer over a heat sensitive chemical indicator in measurng borehole temperature is that the maximum registering thermometer provides a more accurate temperature measurement. However, there is an advantage in running the temperature measurement means with a borehole survey tool, as in the case with the "temp-plates", in that a downhole temperature measurement can if desired be obtained with each survey measurement.

A borehole survey tool is routinely dropped down the inside of a drill pipe that extends to the bottom of a borehole, so that specific information concerning the borehole may be recorded by a survey instrument run with the survey tool. A common form of borehole survey tool, such at that manufactured by Totco, a division of Baker International Corporation, incorporates a chamber for receiving a survey instrument, and a shock absorbing assembly for supporting the survey instrument in the chamber. The shock absorbing assembly includes a helical return spring one end of which bears aginst the survey instrument.

It is an object of this invention to provide a borehole survey tool with which a maximum registering thermometer may be run for recording the borehole temperature.

In one form the invention resides in a borehole survey tool of the type having a chamber for receiving a borehole survey instrument, and a shock absorbing assembly for supporting the survey instrument in the chamber, said shock absorbing assembly including a substantially helical return spring, and wherein there is provided means for measuring borehole temperature comprising a maximum temperature registering thermometer mountable within a casing, said casing having a body portion and a shoulder portion, the casing being mountable in the borehole survey tool with the body portion received within the helical spring and the shoulder portion interposed between the survey instrument or an element of the survey tool and the adjacent end of the helical spring.

The invention will be better understood by reference to the following description of one specific embodiment thereof as shown in the accompanying drawings in which:

FIG. 1 is a fragmentary sectional elevation of a borehole survey tool according to the invention; and FIG. 2 is a sectional elevation of the casing in which the maximum registering thermometer is mounted.

Referring to FIG. 1 of the drawings there is shown (in fragmentary form) a borehole survey tool 11 which is routinely dropped down a drill pipe so that specific data concerning the borehole may be recorded by a survey instrument 13 run with the survey tool 11. The survey tool is later retrieved from the drill pipe so that the survey reading recorded by the instrument 13 may be ascertained and subsequently evaluated. The survey instrument may, for example be a device for recording deviation of the borehole from the vertical.

The borehole survey tool 11 is of somewhat conventional construction, being similar to the type referred to hereinbefore (such as that manufactured by Totco). The survey tool includes a barrel 15 in which there is provided a chamber 17 for receiving the survey instrument 13. The survey instrument is supported in the chamber 17 by a shock absorbing assembly which includes a shock absorber 21 and a substantially helical return spring 23, the survey instrument being located between the shock absorber 21 and the return spring 23. The end of the return spring opposite the survey instrument 13 bears on a seat 25 which is fixed relative to the barrel 15. The shock absorber 21 is a pneumatic snubber for controlling the action of the return spring 23.

Referring now to FIG. 2, a maximum registering thermometer 27 for recording the borehole temperature is mountable in a casing 29 which is in turn mountable in the survey tool 11. The casing 29 is defined by a tubular body portion 31 within the internal passage 33 of which the thermometer 27 is receivable. The ends of the passage 33 are closable by removable top and bottom end caps 35 and 37 respectively, each of which is adapted to threadedly or otherwise securelyengage the body portion 31. The tubular body portion 31 is preferably cylindrical and, together with the end caps 35 and 37, is formed from a thermally conductive material such as aluminum. The end caps 35 and 37 are formed with grooves 39 or the like therein for gripping purposes. The passage 33 is preferably formed so as to conform somewhat to the shape of the thermometer 27, with the thermometer being insertable into the passage through the end thereof closable by the bottom end cap 37.

The body portion 31 and the bottom end cap 37 are dimensioned so are to be receivable with the space defined by the coils of the helical return spring 23. The upper end cap 35 is dimensioned so as to define a shoulder portion 41 which in use is interposed between the survey instrument 13 and the adjacent end of the return sping 23. It is in this way that the casing 29 is mounted within the survey tool 11; the arrangement is such that the casing in no way interferes with the operation of the survey instrument or the shock absorber assembly.

In an alternative arrangement, the shoulder portion 41 of the casing 29 may be interposed between the seat 25 and the end of the return spring 23 adjacent the seat.

The thermometer 27 is supported in the casing 29 in a cushioned manner. In the illustrated arrangement, the side wall of the passage 33 in the casing is formed with an inclined step 42 adjacent the upper end of the passage, the step 42 being inclined inwardly in the direction towards said upper end. The thermometer 27 mounted in the casing is of the type having a tapered transition portion 44 between its bulb 43 and graduated stem 46. The arrangement is such that when the thermometer is mounted in the casing a resilient support 48, such as an O-ring, is disposed between the step 42 and the transition portion 44 of the thermometer to provide lateral and axial support for the respective end of the thermometer. The bulb 43 of the thermometer is at least partially embedded in a substantially soft thermally conductive composition 45 such as grease or graphite paste. The end of the thermometer remote from the bulb 43 is supported axially by a resilient seat 47. The resilient seat 47 is in the form of a pad 49 against which the end of the thermometer bears and a helical compression spring 51 disposed between the pad 49 and the bottom end cap 37. The stem 46 of the thermometer is prvided with lateral support in the casing by a plurality of spaced resilient packing elements 53, such as O-rings, fitted between the side wall of the passage 33 and the stem. In an alternative arrangement, the thermometer may be supported in the casing within thermally conductive packing material.

Maximum registering thermometers are available in a number of temperature ranges. A maximum registering thermometer is therefore selected on the basis of the estimated downhole temperature.

In using the borehole survey tool to obtain a measurement of the borehole temperature, the selected maximum registering thermometer is first shaken or centrifuged to reset the thermometer. The thermometer 27 is then installed within the casing 29 so as to be supported therein in the cushioned manner described beforehand. The casing is mounted in the survey tool 11 with the body portion 31 and bottom end cap 37 received within the helical return spring 23 and the top end cap 35, which defines the shoulder 41, clamped between the survey instrument 13 and the adjacent end of the return spring 23. The survey tool 11 is then dropped down the drill pipe. This may be done before pulling a drill bit out of the borehole ("tripping out") or after returning a drill bit to the bottom of the borehole ("tripping in"). The survey tool is allowed to remain at the bottom of the drill pipe for sufficient time to measure and register the correct downhole temperature. The survey tool is then retrieved from the well pipe, and the thermometer ultimately withdrawn from the casing 29 and the temperatures reading noted. A number of temperature readings at various depths enables the bottomhole temperature and geothermal gradient to be estimated.

A borehole survey tool according to the invention allows a borehole temperature measurement to be made with each survey measurement or at other times even though a survey measurement is not made.

From the foregoing, it is evident that a maximum registering thermometer may be mounted, in the manner described herein, in a conventional borehole survey tool of the type specified (such as the survey tool manufactured by Totco) to form a borehole survey tool according to the invention.

It should be appreciated that the scope of the invention is not limited to the scope of the rembodiment described.

I claim:

1. A borehole survey tool of the type having a chamber, a borehole survey instrument in said chamber, and a shock absorbing assembly for supporting the survey instrument in the chamber, said shock absorbing assembly including a substantially helical return spring for exerting a biasing force on said survey instrument, and wherein there is provided means for measuring borehole temperature comprising a casing defining a passage, a maximum temperature registering thermometer mountable within said casing passage, said casing having a body portion and a shoulder portion, said casing being mountable in the borehole survey tool casing with the body portion received within the helical spring and the shoulder portion being engaged with one end of said helical spring.

2. A borehole survey tool as claimed in claim 1 wherein the thermometer is supported in the casing by cushioning means.

3. A borehole survey tool as claimed in claim 2 wherein the body portion of the casing is tubular, each end of the passage is the body portion being closed by an end cap detachably engagable with the body portion and wherein one of said end caps defines said shoulder portion.

4. A borehole survey tool as claimed in claim 3 wherein the passage is formed with an inclined step in its side wall adjacent one end thereof, said thermometer having a transition portion between a bulb and a graduated stem the transition portion tapering inwardly toward said bulb, the transition portion of the thermometer being disposed adjacent said inclined step in said side wall when said thermometer is mounted in said casing, and wherein said cushioning means includes a resilient support fitted between the transition portion and said inclined step to provide lateral and axial support for said bulb end of said thermometer, a resilient seat providing axial support for the end of said thermometer remote from said bulb, and resilient means providing lateral support for said stem of said thermometer.

5. A borehole survey tool as claimed in claim 4 wherein the resilient seat comprises a pad which in use bears against said end of the thermometer, and a compression spring disposed between the pad and a portion of the casing.

6. A borehole survey tool as claimed in claim 4 wherein the resilient means comprises a plurality of spaced resilient packing elements positioned between the thermometer and the casing.

7. A borehole survey tool as claimed in claim 4 wherein the bulb of the thermometer is at least partially embedded in a substantially soft thermally conductive composition.

8. A borehole survey tool as claimed in claim 3 wherein the passage is shaped so as to generally conform to the shape of the thermometer.

* * * * *